Nov. 3, 1936.  E. DAIBER  2,059,853
BOLT AND NUT CONNECTION
Filed Aug. 25, 1933
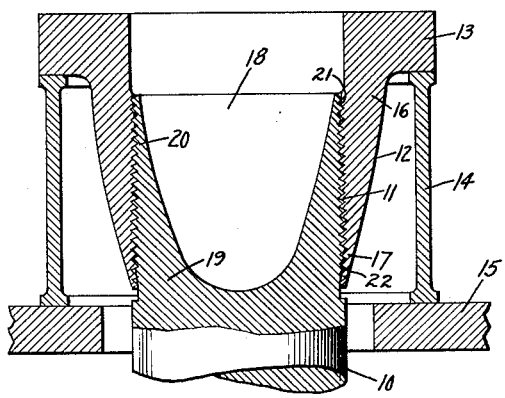
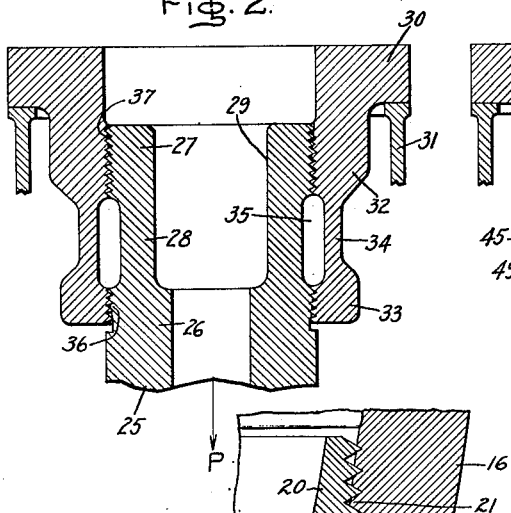
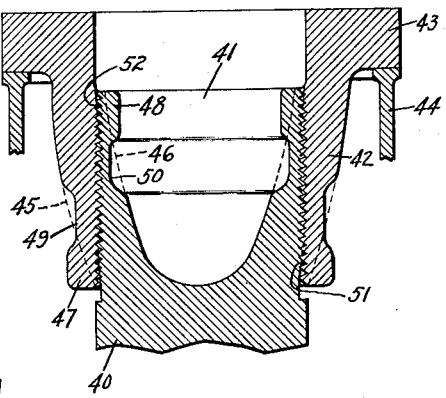
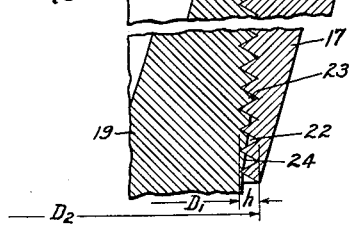
Inventor:
Ernst Daiber,
by Harry E. Dunham
His Attorney.

Patented Nov. 3, 1936

2,059,853

UNITED STATES PATENT OFFICE 2,059,853

BOLT AND NUT CONNECTION

Ernst Daiber, Berlin-Lichterfelde, Germany, assignor to General Electric Company, a corporation of New York Application August 25, 1933, Serial No. 686,727
In Germany October 17, 1932

4 Claims. (Cl. 85—32)

The present invention relates to bolt and nut connections for fastening two machine parts together, more particularly to the kind of connections described in the copending application Serial No. 618,374 of F. Sass and myself, filed June 20, 1932, issued October 23, 1934 as Patent 1,978,229 and assigned to the same assignee as this application, although it is not necessarily limited thereto.

One object of my invention is to provide an improved construction and arrangement of a bolt and nut connection in which the stresses are uniformly distributed on the various portions of the bolt and the nut engaging each other. Another object of my invention is to provide an improved design for the thread of a nut and a bolt whereby injurious effects of the high stresses on certain threads are considerably reduced or eliminated.

For a consideration of what I believe to be novel and my invention, attention is directed to the following description and the claims appended thereto, in connection with the accompanying drawing.

In the drawing Fig. 1 illustrates a bolt and nut connection embodying my invention, Figs. 2 and 3 represent modifications of bolt and nut connections according to my invention, and Fig. 4 shows portions of Fig. 1 to an enlarged scale.

Referring to Fig. 1, the bolt and nut connection comprises a bolt 10 provided with a helical thread 11, and a helically threaded nut 12 screwed onto the thread 11 of the bolt. The upper portion of the nut forms a flange 13 located axially beyond the end of the bolt and supported on a resilient ring member 14 which in turn engages a machine member 15. The latter may be, for example, a portion of a piston of a combustion engine and the bolt may form a portion of a stem in which case the bolt and nut represent a means for connecting or fastening a piston stem to a piston. The nut has a portion 16, hereafter termed a "base portion", adjacent the flange 13 and engaging an upper or end portion of the bolt. Another portion 17 of the nut, hereafter termed a "top portion", engaging a lower portion of the bolt faces the supporting member 15. The cross-sectional area of the nut decreases gradually from the base portion 16 adjacent the flange 13 towards the top portion 17, or from another viewpoint, the cross-sectional area of the nut decreases in proportion to the distance from the flanged base portion. The arrangement so far described is similar to the one disclosed in the above mentioned copending application.

According to my invention the bolt is provided with a bore or depression 18 defining a wall of the bolt with varying cross-sectional area. By cross-sectional area of the bolt I mean the area defined by the inner thread diameter ($D_1$ in Fig. 4) and the central bore 18 of the bolt. Terming a portion 19 of the wall which is near the unthreaded bolt portion a "base portion" of the threaded bolt portion, and an upper or end portion 20 a "top portion" of the threaded bolt portion, then the cross-sectional area of the threaded bolt portion decreases from the base towards the top portion, or from another viewpoint, the base portion of the threaded bolt portion has a cross-sectional area larger than that of the top portion of the threaded bolt portion. In the present arrangement the cross-sectional area of the threaded bolt portion decreases in proportion to its distance from the unthreaded bolt portion. The arrangement is such that the base portion 19 of the threaded bolt portion having the larger cross-sectional area is in engagement with the top portion 17 of the nut having the smaller cross-sectional area, and the top portion 20 of the threaded portion of the bolt having the smaller cross-sectional area engages the base portion 16 of the nut having the larger cross-sectional area. The relation between the wall of the bolt bore and the outer wall of the nut is such that the difference between their radii at different heights remains substantially constant along the entire length of the threaded portions, as can be readily seen from the drawing. Thus, broadly speaking, the bolt and nut connection comprises a bolt member and a nut member, each of which has a portion with a large cross-sectional area and another portion with a small cross-sectional area. The two members are united so that the portion of small cross-sectional area of one member engages the portion of large cross-sectional area of the other member. Considering the invention from still another viewpoint, the bolt and nut each have a threaded and an unthreaded portion. The cross-sectional areas of the threaded portions decrease in proportion to the distance from the corresponding unthreaded portions, each attaining, in an ideal arrangement, zero value, that is, ending in a sharp edge at the top.

Another important feature of my invention comprises the cutting away of outer portions of the teeth or threads of the bolt and nut member near the threadless portions of these members indicated in Fig. 1 and more clearly illustrated in Fig. 4, which latter represents portions of Fig. 1 to an enlarged scale. In this figure I have designated the inner diameter of the thread of the bolt by $D_1$ and the outer diameter by $D_2$. The diameter $D_1$ which is the inner diameter of the thread of the bolt is also the outer diameter of the thread of the nut, and $D_2$ is the inner diameter of the thread of the nut, disregarding the clearance between the threads of the two members. The four threads 21 of the base portion 16 of the nut are cut away conically, that is, the cut away portion starts near the outer diameter $D_1$ of the teeth or threads and ends near the inner diameter $D_2$ of the threads. From another viewpoint, the height $h$ of the threads decreases gradually from an intermediate thread towards the end of the thread near the unthreaded portion or flange 13. Similarly, the threads 22 near the unthreaded portion of the bolt are cut away conically so that these teeth or threads have decreasing height beginning with an intermediate thread 23 and ending with the last thread 24. This obviates the difficulties heretofore incurred with regard to those teeth and threads of threaded bolt and nut members which are particularly endangered due to high tensile and bending stresses. As can be clearly understood from consideration of the drawing, the bending stresses acting on the root of the teeth are considerably relieved by the cutting away of the crown or outer portions of the teeth or threads. These bending stresses have a maximum value with regard to the thread near the unthreaded portions and decrease in proportion to the distance from the unthreaded portion. Therefore, I prefer to cut away the outer portions of the teeth conically which can be accomplished by a simple manufacturing operation.

The cutting away of portions of the endangered threads of a bolt and nut arrangement is not limited to the particular arrangement indicated in the drawing but may be applied to ordinary bolt and nut connections. In the latter case it is generally sufficient to cut away the endangered threads of the bolt at the portion where the bolt enters the nut because these threads are subject to very high tensile and bending forces.

In Figs. 2 and 3 I have shown structures which are in some cases more suitable for practical purposes because they do not have the sharp end or top portions and therefore permit an easier cutting of the threads. The threaded portion of the hollow bolt 25 of Fig. 2 comprises a base portion 26 of large cross-sectional area and a top portion 27 of small cross-sectional area. The two portions are connected by an unthreaded intermediate portion 28 of substantially reduced cross-sectional area with respect to the other portions. The different cross-sections of the base and top portions are obtained by the provision of a central bore 29 with a diameter near the top portion larger than the diameter near the base portion. The nut comprises a flange 30 engaging a member 31 corresponding to the member 14 in Fig. 1, a threaded base portion 32 of large cross-sectional area and engaging the top portion 27 of the bolt, and a top portion 33 of small cross-sectional area engaging the base portion 26 of the bolt. The base portion 32 and the top portion 33 are connected by an unthreaded intermediate portion 34, in the present instance, adjacent the intermediate portion 28 of the bolt, and therewith defining an annular space 35. The cross-sectional area of the portion 34 is reduced with respect to the areas of the portions 32 and 33.

An important feature of the arrangement just described is the provision of the intermediate portions with substantially reduced cross-sections. If during operation the bolt 25 carries a load P, a portion $P_1$ of this load is transferred to the threaded top portion 33 of the nut. The magnitude of the load or force $P_1$ can be determined from the following equation which has been derived from simple stress and stretch equations for the different bolt and nut portions:

$$P_1 = \frac{P \times f_{34}}{f_{28} + f_{34}},$$

in which $f_{34}$ represents the cross-sectional area of the intermediate portion 34 of the nut, and $f_{28}$ the cross-sectional area of the intermediate portion 28 of the bolt. The equation clearly shows that the load $P_1$ carried by the top portion 33 of the nut can be made small by making the intermediate portion 34 of the nut of small cross-sectional area. In order to obtain substantially uniform distribution of forces among the several threads of the portion 33, it is preferable to make this portion of comparatively short length.

The teeth 36 of the bolt are cut away conically towards the unthreaded portion of the bolt and the teeth 37 of the nut are cut away conically towards the unthreaded portion of the nut, as more fully described with respect to the arrangement shown in Figs. 1 and 4.

The structure illustrated in Fig. 3 comprises a bolt 40 having a central depression 41 in an upper screw-threaded portion and a nut 42 screwed onto the threaded portion of the bolt and including a flanged portion 43 supported on an elastic member 44 corresponding to the member 14 in Fig. 1. The cross-sectional areas of the threaded bolt and nut portions decrease in the ideal arrangement until they reach zero value at the outer end of each portion. This ideal form, corresponding to the arrangement of Fig. 1, has been indicated by dotted lines 45 and 46. In accordance with the embodiment of Fig. 3, the sharp end or top portions of the nut and bolt members are provided with reinforcements 47 and 48 respectively. These reinforcements cause a non-uniformity in the load distribution on the threads, which undesirable effect is at least partly eliminated by reducing the cross-sectional area of intermediate portions adjacent the top portions of said members. In the present arrangement the nut has an intermediate portion 49 adjacent the top portion with a substantially reduced cross-sectional area. The drawing clearly shows that this cross-sectional area is partly smaller than that of the ideal structure. Similarly, the bolt is provided with an intermediate portion 50 adjacent the top portion 48 having a substantially reduced cross-sectional area. The cross-section of the intermediate portion 50 is smaller than the cross-section required for an ideal arrangement indicated by the dotted line 46. In the arrangement of Fig. 3, both intermediate portions are provided with a thread. The intermediate portion of each member engages a base portion of the other member.

The height of the teeth 51 of the bolt engaging the reinforced threaded portion 47 of the nut decreases toward the unthreaded portion of the bolt, and the teeth 52 of the nut engaging the teeth of the reinforced portion 48 of the bolt have a height decreasing toward the unthreaded portion of the nut, that is the thread of the base portion of each member has a height which decreases from an intermediate tooth or thread toward the unthreaded portion of the member, similar to the arrangement described more fully with respect to Figs. 1 and 4.

Having described my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. The combination of a bolt having a threaded end portion and a central recess defining a wall having a base portion of large cross-sectional area, a top portion of small cross-sectional area and an intermediate portion having a cross-sectional area substantially reduced with regard to the areas of the top and the base portion, and a nut screwed onto the bolt having an upper flanged portion for supporting the bolt and the nut, the threaded portion of the nut comprising a base portion of large cross-sectional area engaging the top portion of the bolt and a top portion of small cross-sectional area engaging the base portion of the bolt, and an intermediate portion of a cross-sectional area smaller than the areas of the base and top portions.

2. The combination of a bolt having a threaded end portion with a central recess defining a wall having a base portion of large cross-sectional area, a top portion of small cross-sectional area and an intermediate portion having a cross-sectional area substantially reduced with regard to the areas of the top and the base portion, and a nut screwed onto the bolt having an upper flanged portion for supporting the bolt and the nut, the threaded portion of the nut comprising a base portion of large cross-sectional area engaging the top portion of the bolt and top portion of small cross-sectional area engaging the base portion of the bolt and an intermediate portion of a cross-sectional area smaller than the areas of the base and top portions, the intermediate portions of the bolt and the nut defining an annular space therebetween.

3. The combination of a bolt member and a nut member screwed onto the bolt member, each member having a base portion, an intermediate portion and a top portion, the base portions having cross-sectional areas larger than the cross-sectional areas of the top portions, the intermediate portions having cross-sectional areas smaller than those of the corresponding base and top portions to form flexible connections between the corresponding top and base portions, the base portion of the nut being flanged and engaging the top portion of the bolt, and an elastic member for supporting the flanged base portion of the nut.

4. The combination of a bolt member and a nut member screwed onto the bolt member, each member having a base portion, an intermediate portion and a top portion, the base and top portions having helical threads, the intermediate portions being recessed to define an annular channel and forming flexible connections between the corresponding top and base portions.

ERNST DAIBER.